(No Model.)  4 Sheets—Sheet 1.
E. JORDAN.
SIDE SEAM SOLDERING MACHINE.
No. 306,494. Patented Oct. 14, 1884.
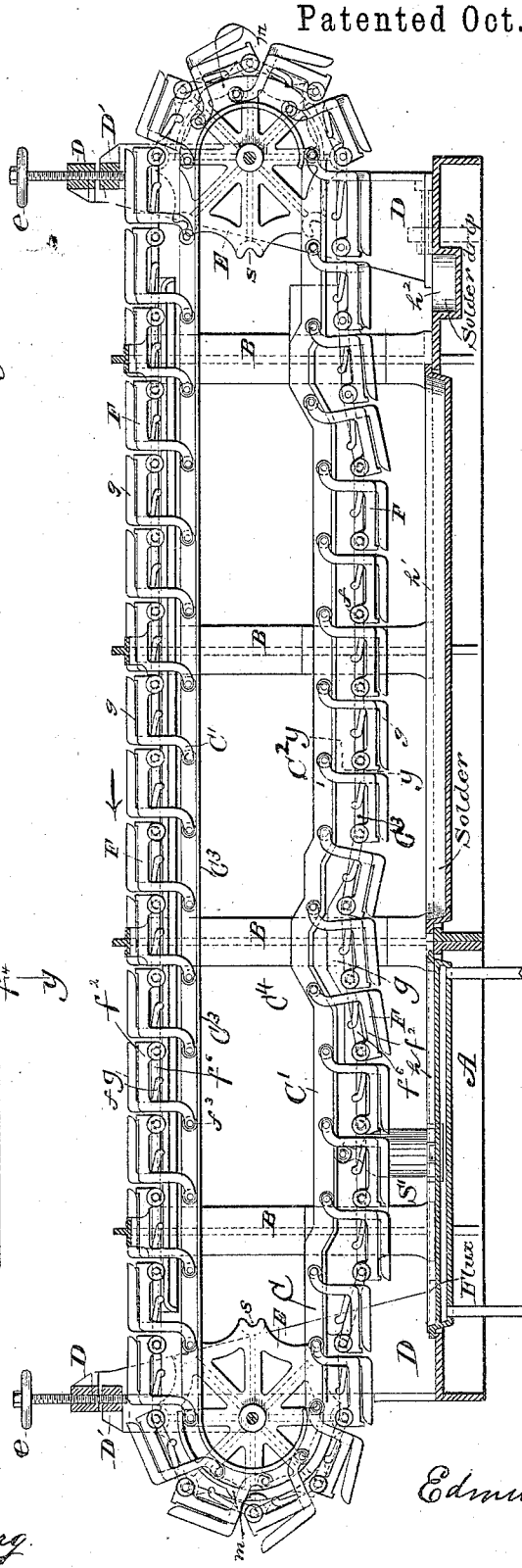
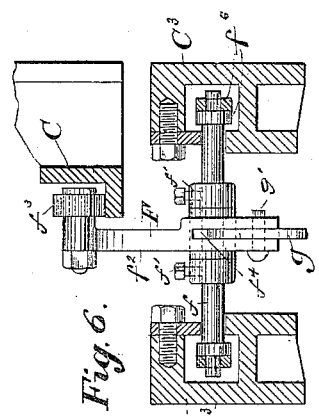
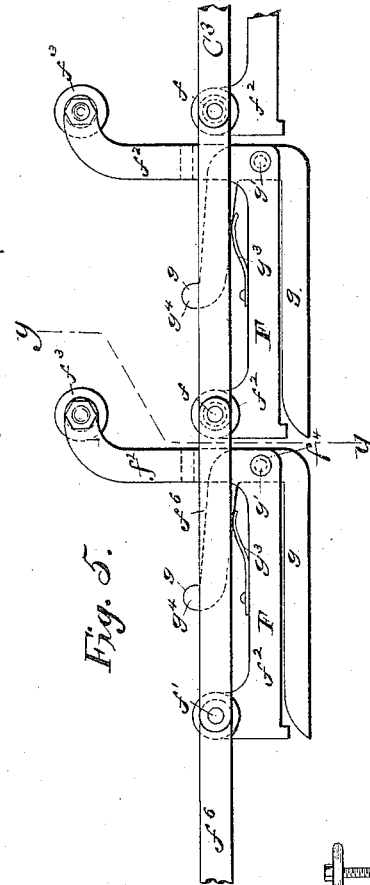
WITNESSES.
J. H. Templin
C. A. Blomberg
INVENTOR.
Edmund Jordan

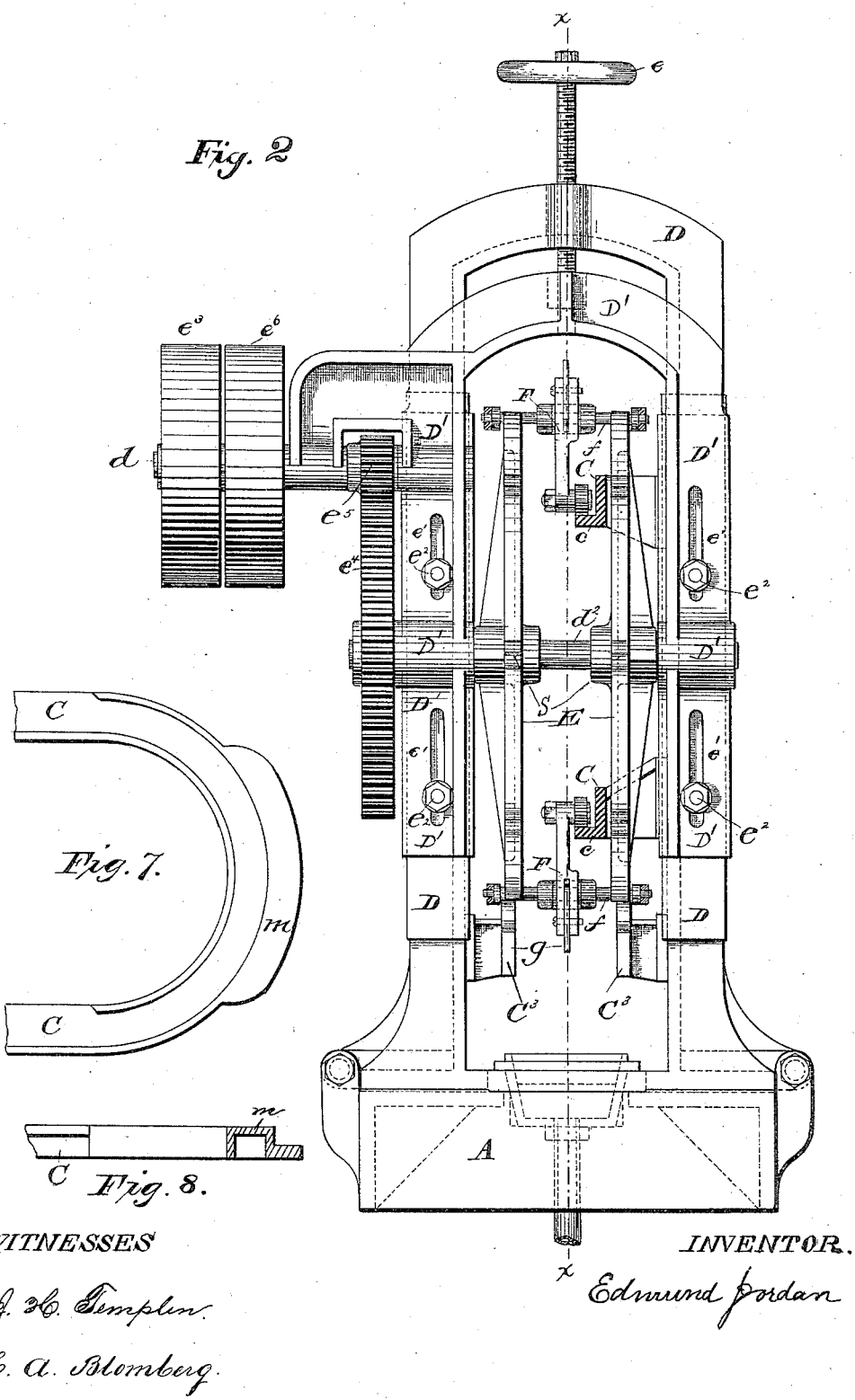

(No Model.) 4 Sheets—Sheet 3.

E. JORDAN.
SIDE SEAM SOLDERING MACHINE.

No. 306,494. Patented Oct. 14, 1884.

WITNESSES.
J. H. Templin
C. A. Blomberg.

INVENTOR.
Edmund Jordan (No Model.)  4 Sheets—Sheet 4.
E. JORDAN.
SIDE SEAM SOLDERING MACHINE.
No. 306,494. Patented Oct. 14, 1884.
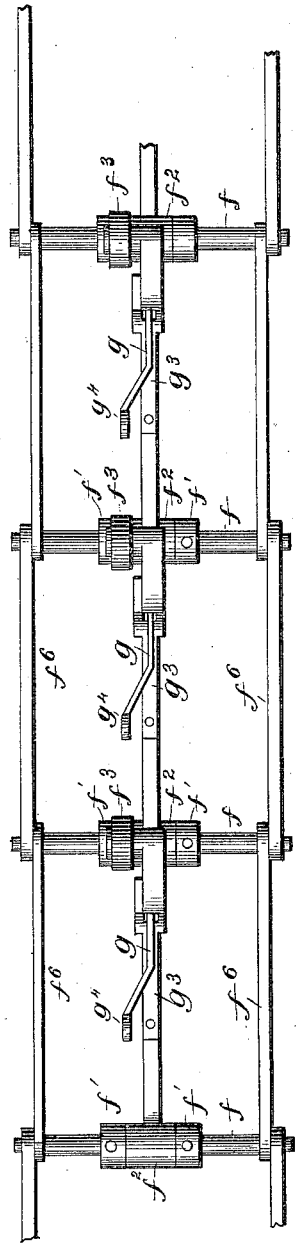
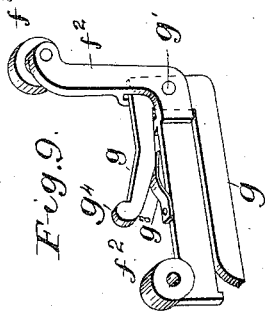
Witnesses:
J. H. Templin.
Frank Rudolph.
Inventor.
Edmund Jordan
by E. W. Bliss
Atty.

UNITED STATES PATENT OFFICE.

EDMUND JORDAN, OF BROOKLYN, NEW YORK, ASSIGNOR TO ELIPHALET W. BLISS, OF SAME PLACE.

SIDE-SEAM-SOLDERING MACHINE.

SPECIFICATION forming part of Letters Patent No. 306,494, dated October 14, 1884.

Application filed March 19, 1884. (No model.)

*To all whom it may concern:*

Be it known that I, EDMUND JORDAN, a citizen of the United States, residing in the city of Brooklyn, in the county of Kings and State of New York, have invented a new and useful Improvement in Side-Seam-Soldering Machines, of which the following is a full and clear description, reference being had to the accompanying drawings, and to the letters and figures marked thereon.

My invention relates to a soldering-machine for soldering the side seams of sheet-metal cans; and it consists in a flux bath, a solder bath, a device for carrying the cans into, through, and out of the flux bath, into, through, and out of the solder bath, and to discharge the cans when soldered.

Figure 3:
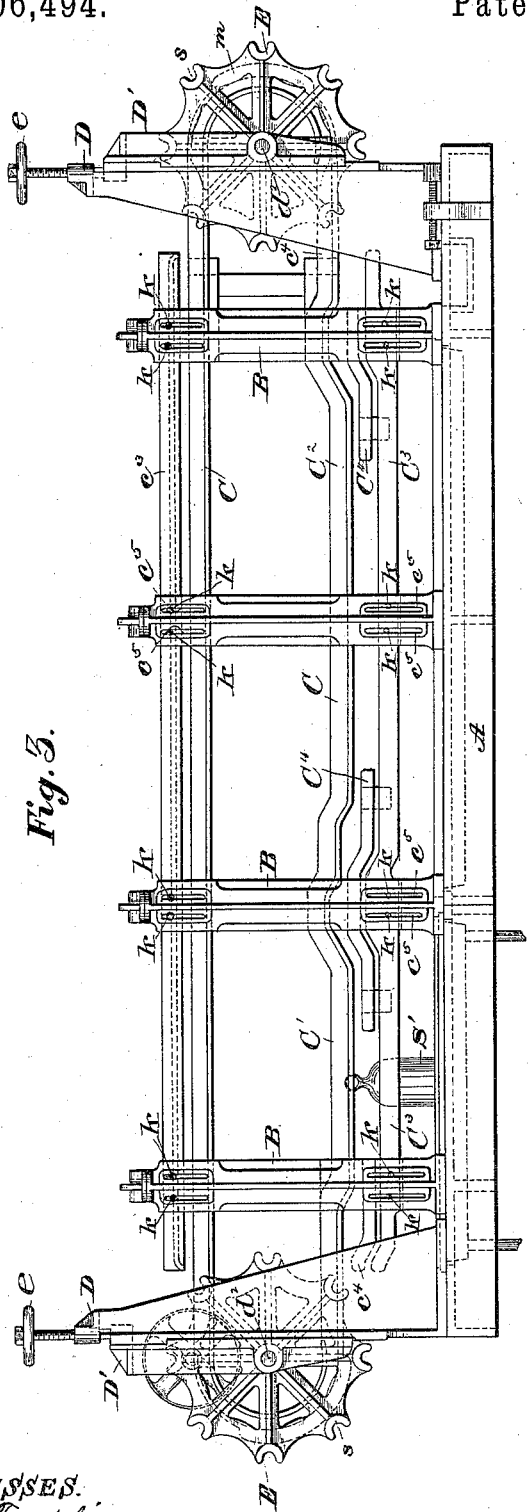
Figure 4:
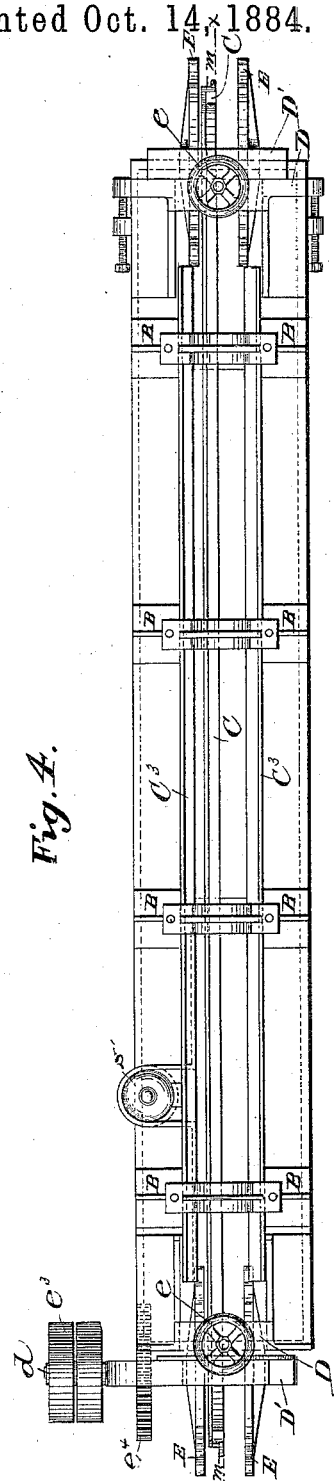

Figure 1 represents a vertical longitudinal section of my improved machine, taken at $xx$, Fig. 4. Fig. 2 represents an end elevation. Fig. 3 represents a side elevation of the machine without the belt-clamp lever device. Fig. 4 represents a top view of the machine. Fig. 5 represents a side view of a section of the belt-clamp lever device for carrying the cans. Fig. 6 represents an end view of the carrying-clamp and a side view of the endless clamp-chain on which the carrying-clamps are secured, and a section view of the tracks carrying the endless chain and clamps. Fig. 7 represents a side view of the stationary cam on an endless track for opening and closing the jaws of the clamp. Fig. 8 is a section view of the same. Fig. 9 is a perspective view of the clamping device. Fig. 10 is a plan view of the endless chain and clamping device.

Having described my invention in reference to the figures illustrated in the accompanying drawings, I shall now proceed to describe it by reference to the letters marked thereon, in which—

A represents the bed-plate of the machine.

B represents the uprights carrying the track-guides and secured to the bed-plate.

C represents the endless guide-track for regulating the position of the clamps in carrying the work through the machine.

C' represents a depression in the lower part of the endless track over the flux bath.

$C^2$ represents a depression in the same over the solder bath.

$C^3$ represents guide-tracks for carrying and guiding the endless chain carrying the clamps.

$C^4$ represents the guides over the endless chain at the point where the work is depressed into and elevated out of the flux and solder baths.

$C^5$ represents adjustment-slots in the uprights at the points where the guide-tracks are secured to the same.

D represents the uprights carrying the sprocket-wheels for driving the endless chain.

D' represents adjustable boxes secured to D.

E represents the sprocket-wheels on which the endless chain works.

S represents the notches in the wheels to receive the cross-bars of the endless chain.

F represents the endless chain and the clamps for carrying the work to the soldered.

$f^2$ represents a part of the clamp fitted loosely to the cross-bar $f$ of the endless chain, so as to oscillate on the cross-bar and carrying the guide-roll $f^3$, working on the guide-track C. (See Fig. 6.)

$g$ is a bent lever forming a part of clamp F, pivoted to $f^2$ at $g'$, and closed and held in the position shown by a spring, $g^3$.

$g^4$ represents the rounded end of the bent lever $g$, which works on the stationary cams $m$, Figs. 7 and 1. The office of these cams is to open the jaws of the clamps to receive the work and discharge the same.

$f'$ represents collars and set-screws to hold the clamp in its proper position on the cross-bar of the endless chain.

$f^6$ represents the side links of the endless chain F.

$e$, Fig. 2, represents the hand-wheels and screws for vertically adjusting the sprocket-wheel, shafts E working in boxes D', as shown in Figs. 2 and 3.

$e'$ represents slots in D', allowing a vertical adjustment of the same by bolts and nuts $e^2$.

$k$ represents the holes for bolts to secure the guide-tracks to the uprights.

$e^4$ represents a gear-wheel made fast to the sprocket-wheel shaft.

$e^3$ and $e^6$ represent fast and loose pulleys on a shaft that carries a pinion-wheel, $e^5$, working in gear-wheel $e^4$, as shown in Fig. 2.

$h$ represents a flux bath with a chambered space underneath the same for the circulation of heated water through the pipes, the broken ends of which are shown at each end of the bath. These pipes are to be connected with the water-tank to be heated to raise the flux to a moderate degree of heat.

$h'$ is a solder bath.

$h^2$ is a bed-plate to catch the drops of solder that may fall from the cams after being elevated out of the solder bath.

$S'$ represents a fountain to supply the flux bath with the material used to flux the solder.

Operation: While that part of the endless chain and the clamps shown at the top of the machine in section view, Fig. 1, is moving from right to left the end $g^4$ of the bent lever $g$ in the clamp is carried onto the stationary cam $m$, Fig. 1, thereby opening the clamp to receive the work to be soldered. At this point the operator inserts the work between the jaws of the clamp. After the clamp has moved to a point under the sprocket-wheel shaft the end $g^4$ of the bent lever leaves the stationary cam M, allowing the spring $g^3$ to close the jaws of the clamp and carry the work into, through, and out of the flux bath $h$ into, through, and out of the solder bath $h'$ to a point under the sprocket-wheel shaft at the end of the machine. At this point the rounded end $g^4$ of the bent lever strikes the stationary cam $m$, (shown in Fig. 3,) thereby opening the jaws of the clamp and allowing the work to drop from the clamp by its own gravity.

What I claim as new, and desire to secure by Letters Patent, is—

1. The herein-described soldering-machine, having a flux bath, a solder bath, an endless chain provided with clamps for holding, carrying, and discharging the work, and means for operating the chain and the clamps combined, as described.

2. The herein-described soldering-machine, having a flux bath, a solder bath, an endless chain, one or more endless tracks for carrying the chain, and a clamping device for holding, carrying, and discharging the work, and means for operating the chain and the clamping device, as described.

3. The herein-described soldering-machine, having a flux bath, a solder bath, an endless track for carrying the endless chain, with a depression in the lower part of the tracks over the flux bath, and with a similar depression over the solder bath, an endless chain, a clamping device supported on and carried by the chain, guided by the track for holding and carrying into, through, and out of the acid bath into, through, and out of the solder bath and discharging the work, and means for operating the chain and the clamps, combined and arranged as described.

EDMUND JORDAN.

Witnesses:
C. WILLIAMS,
WM. G. WILLS.